United States Patent [19]
Bedu et al.

[11] 4,447,766
[45] May 8, 1984

[54] SUPPLY DEVICE FOR A FLASH TUBE

[75] Inventors: Marcel Bedu, Clamart; Marcel Jeanjean, Montgeron, both of France

[73] Assignee: Commissariat a l'Energie Atomique, Paris, France

[21] Appl. No.: 302,701

[22] Filed: Sep. 16, 1981

[30] Foreign Application Priority Data

Sep. 23, 1980 [FR] France ................................ 80 2414

[51] Int. Cl.³ ............................................ H05B 41/32
[52] U.S. Cl. ................................ 315/241 R; 315/173; 315/205; 315/240; 315/362
[58] Field of Search ................... 315/173, 240, 241 R, 315/241 P, 362, 205; 372/70

[56] References Cited

U.S. PATENT DOCUMENTS 3,681,649  8/1972  Uno et al. ................... 315/241 P X

FOREIGN PATENT DOCUMENTS 2170871  9/1973  France .
2308271  11/1976  France .

Primary Examiner—Eugene R. LaRoche
Attorney, Agent, or Firm—Kerkam, Stowell, Kondrack & Clarke

[57] ABSTRACT

Supply device for a flash tube comprising a capacitor, a d.c. voltage source connected to the capacitor, an energy switch located between the capacitor and the flash tube, a circuit able to emit a control pulse for the said switch and a preionization circuit for the flash tube, wherein the preionization circuit comprises a second energy switch connected to the capacitor across a variable resistor, as well as to the flash tube, and a second circuit able to emit a control pulse for the second switch, said second pulse being in advance of the first pulse.

Application to the optical pumping of lasers.

1 Claim, 1 Drawing Figure

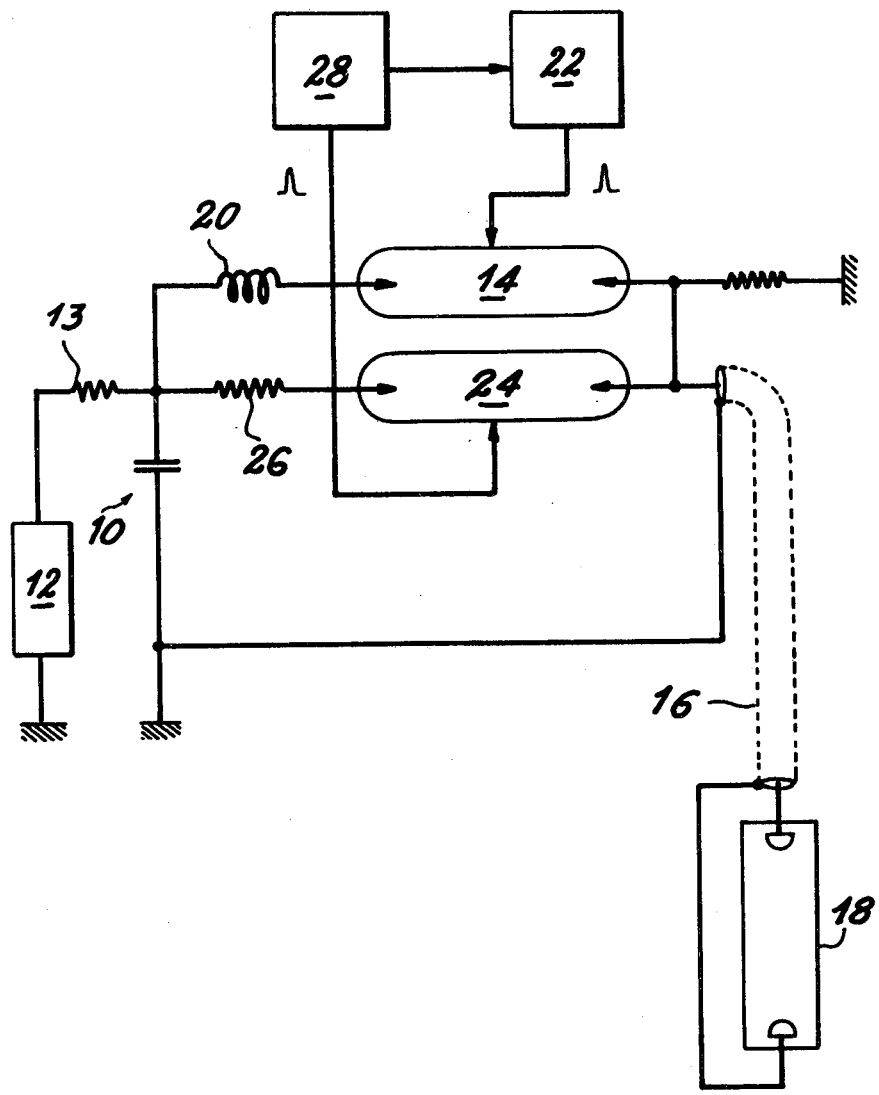

SUPPLY DEVICE FOR A FLASH TUBE

BACKGROUND OF THE INVENTION

The present invention relates to a supply device for a flash tube. It is used in the optical pumping of lasers and particularly iodine compound lasers.

A preionization has already been proposed for improving the supply conditions of flash tubes used for optical pumping. In the prior art, this preionization was generally obtained by high frequency excitation.

However, such a procedure has a number of disadvantages. Firstly, it requires the use of a winding wound around the flash tube or located in the vicinity thereof and supplied by an auxiliary voltage source. This winding leads to interference to the optical elements located in the immediate vicinity of the flash tube. In addition, this procedure needs an additional supply source, which is not of the same type as that of the main discharge. Finally, although this procedure is satisfactory in connection with the ignition of the flash tube, it does not significantly modify the excitation efficiency.

BRIEF SUMMARY OF THE INVENTION

The object of the present invention is a device which obviates the above disadvantages. To this end, it is designed so as to obviate any action taking place on the flash tube, all the elements of the device being collected together at the supply circuits. Furthermore, the device according to the invention leads to a considerable increase in the pumping efficiency of lasers functioning by ultraviolet radiation absorption, because it surprisingly leads to a significant increase in the radiation intensity emitted by the flash tube in the region of approximately 2700 Å. Finally, the device according to the invention is characterized by optimum simplicity.

These results are obtained by the use of special means for carrying out the preionization. Specifically, the present invention relates to a supply device for a flash tube comprising in per se known manner a capacitor, a d.c. voltage source connected to the capacitor, an energy switch located between the capacitor and the flash tube, a circuit able to emit a control pulse for the said switch and a preionization circuit for the flash tube, wherein the preionization circuit comprises a second energy switch connected to the capacitor across a variable resistor, as well as to the flash tube, and a second circuit able to emit a control pulse for the second switch, said second pulse being in advance of the first pulse.

BRIEF DESCRIPTION OF THE DRAWING AND PREFERRED EMBODIMENT

The invention is described in greater detail hereinafter relative to a non-limitative embodiment and the single drawing showing a device according to the invention.

The device comprises a capacitor 10 charged by a d.c. voltage source 12 across a resistor 13, a first energy switch 14 (of the spark gap type having two main electrodes and a trip electrode) connected to the capacitor and, by means of a coaxial line 16 to the flash tube 18. The winding 20 represents the distributed inductance of the circuit. Switch 14 is controlled by a circuit 22 able to emit, for example, a very high voltage, short pulse applied to the trip electrode of the switch. The device shown also comprises means for carrying out the preionization of the flash tube and which comprise a second energy switch 24 connected to capacitor 10 by a variable resistor 26 and to the flash tube by the coaxial line 16 used for the main discharge. This second switch is controlled by a circuit 28 able to emit a very high voltage, short pulse which precedes the pulse emitted by circuit 22.

This device operates in the following way. The charging voltage of capacitor 10 is set slightly above the optimum value chosen for the main discharge. A preionization in the flash tube is firstly started by means of circuit 28 controlling switch 24. The energy necessary for preionization is taken from the storage energy of capacitor 10. After a predetermined time, switch 14 is controlled by means of circuit 22 and the main discharge takes place.

For example, it is possible to store 5 kJ at 40 kV in capacitor 10, bring about a preionization current of 400 mA and, at the end of 40 ms, to start the main discharge which is supplied by the remaining energy (4.5 kJ) at a lower voltage (38 kV).

The preionization current can be regulated by resistor 26. The gap between the control pulse triggering times of switches 14 and 24 can be obtained and regulated by means of a delay network located in circuit 22 and supplied by circuit 28.

Analysis of the radiation emitted by a flash tube supplied by the aforementioned device reveals that the plasma starts in the centre of the tube and evolves towards the periphery, whilst having a good homogeneity. Without preionization, the plasma starts in an erratic manner in the vicinity of the tube walls and evolves towards the centre in a non-uniform manner.

Spectroscopic analysis shows that in the range 2500 to 2900 Å, the radiation intensity is increased by approximately 60% by the preionization obtained by the device according to the invention, without new lines appearing or old lines disappearing.

In addition to the already mentioned advantages the device according to the invention has the additional advantage of easily permitting the detection of problems in the discharge circuit by simply examining the preionization current. If the latter appears to be abnormal, tripping of the main switch is blocked.

Naturally, the means described in the case of the supply of a single flash tube can easily be modified to obtain a supply of several flash tubes.

The invention is particularly advantageous in the case of the optical pumping of $C_3F_7I$-based gaseous compounds mixed with a topping-up gas such as argon, nitrogen or carbon dioxide. The emission wavelength is then 1.315 μm.

What is claimed is:

1. A supply device for a flash tube, comprising a capacitor, a d.c. voltage source connected to the capacitor, a first spark gap located between the capacitor and the flash tube, a circuit able to emit a first control pulse applied to said first spark gap, a second spark gap connected to the capacitor across a variable resistor and to the flash tube, and a second circuit able to emit a second control pulse for the second spark gap, said second control pulse being in advance of the first control pulse, said second control pulse closing said second spark gap and controlling a preionization current through said flash tube, said first control pulse occuring after said second control pulse during said preionization current and closing said first spark gap and controlling a main discharge through said flash tube, said main discharge being superimposed on said preionization current.

* * * * *